(12) United States Patent
Wagner et al.

(10) Patent No.: US 7,168,238 B2
(45) Date of Patent: Jan. 30, 2007

(54) METHOD FOR HEATING UP A CATALYST IN COMBUSTION ENGINES WITH DIRECT FUEL INJECTION

(75) Inventors: Jens Wagner, Stuttgart (DE); Andreas Kufferath, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 482 days.

(21) Appl. No.: 10/250,749

(22) PCT Filed: Jan. 9, 2002

(86) PCT No.: PCT/DE02/00034

§ 371 (c)(1),
(2), (4) Date: Oct. 14, 2003

(87) PCT Pub. No.: WO02/055857

PCT Pub. Date: Jul. 18, 2002

(65) Prior Publication Data

US 2004/0055561 A1    Mar. 25, 2004

(30) Foreign Application Priority Data

Jan. 9, 2001  (DE)  ............................... 101 00 682

(51) Int. Cl.
*F01N 3/00*  (2006.01)
(52) U.S. Cl. ........................ 60/284; 60/274; 60/285; 60/286; 60/300

(58) Field of Classification Search ................. 60/274, 60/284, 285, 286, 299, 300
See application file for complete search history.

(56) References Cited

U.S. PATENT DOCUMENTS

| 5,590,521 | A | 1/1997 | Schnaibel et al. |
| 5,979,397 | A | 11/1999 | Machida et al. |
| 6,044,642 | A | 4/2000 | Nishimura et al. |
| 6,209,517 | B1 | 4/2001 | Yasui |
| 6,345,499 | B1 | 2/2002 | Nishimura et al. |
| 6,394,063 | B1 | 5/2002 | Volz et al. |
| 6,449,946 | B2 | 9/2002 | Kuji et al. |
| 6,512,983 | B1 | 1/2003 | Bauer et al. |

FOREIGN PATENT DOCUMENTS

| EP | 0 856 655 | 8/1998 |
| EP | 0 990 794 | 4/2000 |
| EP | 1 130 241 | 9/2001 |
| WO | WO 00 08329 | 2/2000 |

*Primary Examiner*—Thomas Denion
*Assistant Examiner*—Diem Tran
(74) *Attorney, Agent, or Firm*—Walter Ottesen

(57) ABSTRACT

A method for heating up a catalytic converter in internal combustion engines having gasoline direct injection is presented and has the steps: shifting the ignition toward retard; checking whether the charge of the cylinders with air exceeds a pregiven threshold; and, dividing the fuel injection into two component quantities which are injected in advance of the ignition when the air charge exceeds the threshold.

12 Claims, 2 Drawing Sheets

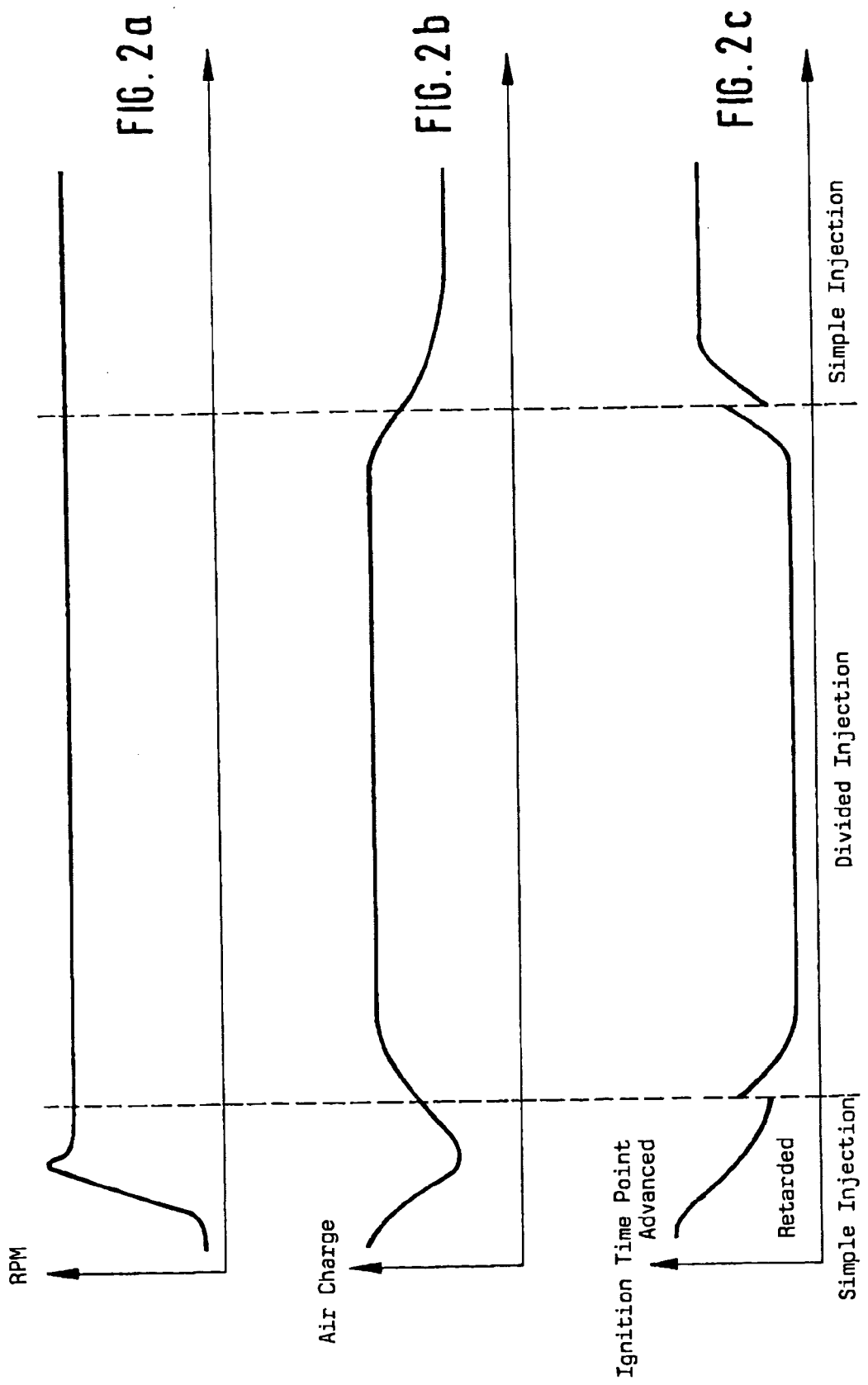

METHOD FOR HEATING UP A CATALYST IN COMBUSTION ENGINES WITH DIRECT FUEL INJECTION

RELATED APPLICATION

This application is the national stage of PCT/DE 02/00034, filed Jan. 9, 2002, designating the United States and claiming priority from German patent application no. 101 00 682.9, filed Jan. 9, 2001, the entire contents of both applications are incorporated herein by reference.

It is already known to heat up the catalytic converter because of the results of a deterioration of the efficiency of the engine combustion. A deterioration of efficiency of the engine combustion can, for example, be caused by a deviation of the ignition time point from the optimal time point. The optimal time point is defined by the maximum efficiency. Because of the deterioration of efficiency, the exhaust gas is hotter compared to operation without efficiency deterioration. For this reason, the exhaust gas develops an increased heat effect in the catalytic converter. This so-called engine catalytic converter heating has the advantage to be able to do without additional components, for example, a secondary air pump.

For engines having gasoline-direct injection, two possibilities are in principle present to increase the exhaust-gas temperature without building in additional components, namely:

(i) Retarded ignition to deteriorate the efficiency of the combustion. The ignited mixture is stoichiometric or slightly lean.

The retarded ignition is limited for homogeneous mixture because of the increasing rough running with retarded ignition. For low catalytic-converter temperatures, the emissions can be improved by slightly lean exhaust-gas lambda because the catalytic converter reaches the required conversion conditions. For a cold engine, however, a leaning is only possible to a limited extent.

(ii) Additional injection of fuel after completed ignition for after combustion. The ignited mixture is very lean (stratified operation) and is still ignitable because of a charge stratification.

In an after injection, the complete combustion of the additionally injected fuel mass has to be ensured (after combustion).

In order to ensure an after combustion in the exhaust-gas manifold, the exhaust-gas manifold must be optimized in its configuration (early through mixing, low thermal mass). Other objectives (reduction of the space needed for installation, power optimization) can be limited thereby. In principle, the after combustion takes place poorer when the exhaust-gas manifold is cold. For this reason, the emissions shortly after start can hardly be reduced because the catalytic converter does not yet have the required temperature.

Because higher temperatures are present in the combustion chamber, low emissions can be obtained with an after combustion in the combustion chamber already shortly after start. Should the fuel still be ignited in the combustion chamber, then the operating parameters must be held in a tight window. Especially, the after injection must be deposited very early and therefore contributes significantly to the development of torque. This requires short injection times for low load points which implies very high requirements on the injection valves with respect to metering accuracy and mixture preparation.

In order to avoid the problems of the after injection, an improvement of the heating method with late ignition is now described.

For engines having gasoline-direct injection, the possibility exists to divide the fuel injection ahead of the ignition in order to influence the mixture preparation.

The engine running can be improved by the division of the injection ahead of the ignition:

(i) A later ignition time point is possible with an improved rough running.
(ii) The mixture can be leaned earlier and more greatly than a purely homogeneous mixture with uniform charge of the combustion chamber with an air/fuel mixture.
(iii) Compared to the after injection of fuel, the method is significantly more robust and avoids extremely short injection times with the above-mentioned disadvantages.

To ensure a reliable start and run-up, these phases can still take place with a simple homogeneous injection.

A division of the injection takes place, according to the invention, only as soon as sufficient air charge is present. In this way, injection times, which are too short, are avoided. Furthermore, it is ensured that the charge movement necessary for mixture preparation is present.

A mixture stratification arises because of the division of the injection. In this way, a very rich mixture can be present at the spark plug even though the lambda summation is still lean.

Because of the rich mixture about the spark plug, a reliable ignition can be ensured also for very lean lambda summation.

Additionally, and notwithstanding late ignition, a reliable rapid start-to-burn of the mixture is ensured. The smooth running therefore is increased with late ignition.

The mixture distribution (in the ideal case, rich in the center of the combustion chamber and lean on the walls of the combustion chamber), which adjusts with the divided injection and takes place ahead of the ignition, can reduce the wall heat losses. Depending upon the combustion chamber shape and the parameters, the following effects can result:

(i) Higher exhaust-gas temperature for the same exhaust-gas quantity, that is, more heating power. The light-off temperature at which the conversion of toxic substances in the catalytic converter begins is reached more quickly.
(ii) Lesser exhaust-gas quantity at the same temperature because the wall heat losses are lower. The dwell times of the toxic-substance components in the exhaust-gas manifold and the catalytic converter are then longer whereby a post reaction is facilitated. The emission downstream of the catalytic converter can therefore also be improved hereby.

Because of the non-homogeneous mixture distribution, and especially from the rich regions, an increased CO raw emission can be obtained. Experience has shown that CO limit values can be easily satisfied. An increased CO raw emission can, however, be utilized for an earlier light-off of the catalytic converter because the light-off temperature for the CO lies below the light-off temperature of hydrocarbons. At the same time, the NOx emissions drop because less NOx arises in the rich region as well as also in the lean peripheral zone.

With the suggested heating strategy, the ignition is principally retarded. Whether additionally the fuel injection is divided can depend on one or several operating parameters, for example, on the air charge, the engine temperature, the combustion chamber temperature (each measured or modeled, for example: cumulative injection mass after start), the requested desired torque and/or the rpm.

For a divided injection, the combustion efficiency is different from a simple homogeneous injection. This is considered in the switchover of the injection in that, with the switchover, the ignition time point is adapted. Additionally, the precontrolled air charge can be adapted in advance of the switchover. The change of the torque because of the change of the air charge is then compensated via a change of the ignition time point which influences the torque in the opposite direction.

The injection should only be switched over when the instantaneous air charge permits an adjustment of the requested torque via an adaptation of the ignition time point.

Different operating limits apply for an operation with divided injection. For this reason, a lean summation lambda and/or a more retarded injection is adjusted as required.

Necessary enrichment for the compensation of wall film effects or the like (post-start enrichment) are considered differently for the two injections.

In detail, the method of the invention concerns the heating of the catalytic converter in internal combustion engines with the steps:

increasing the air charge while simultaneously shifting the ignition to retard to compensate for the additional air;

checking whether the air charge of the cylinder exceeds a pregiven threshold;

dividing the fuel injection into two component quantities which are injected in advance of the ignition as soon as the air charge exceeds the threshold.

A configuration of the invention provides that the ignition time point is also adapted with the switchover of the fuel injection in order to ensure constant torque during the switchover. In this way, an efficiency change, as it is to be expected as a consequence of the division of the fuel injection, is advantageously compensated.

A further embodiment of the invention provides that, after completed switchover of the fuel injection to divided injections, the air charge is increased further and the ignition is further retarded to compensate the increase in torque expected because of the additional air.

A further embodiment of the invention provides that the precontrol of the air charge is again reduced via the switchover in advance of ending the division of the fuel injection corresponding to the change of efficiency and combustion limits.

A further embodiment of the invention provides that, in combination with the switchover of the fuel injection, the precontrol of the air charge is adapted in correspondence to the expected efficiency change in each case, the change of the air charge is corrected by adapting the ignition time point and the switchover of the fuel injection takes place in dependence upon whether the requested torque can be reached for the instantaneous air charge and the known combustion limits also with the changed fuel injection.

A further embodiment of the invention provides that the summation lambda in the combustion chamber is precontrolled to be leaner after the start of the division of the fuel injection than for a simple non-divided injection.

A further embodiment of the invention provides that, before the end of the division of the fuel injection, the summation lambda in the combustion chamber is again controlled richer than at the start of the divided injection in order to ensure a reliable transition to the homogeneous operation.

A further embodiment of the invention provides that with the start of the division of the fuel injection, the correction of the fuel injection is reduced to compensate for possible wall losses (post-start enrichment).

A further embodiment of the invention provides that the engine torque is adjusted primarily via the ignition time point and the precontrolled air charge; whereas, the injected fuel mass is dependent directly upon the detected air charge and a preprogrammed air/fuel ratio.

If required, the division of the injection quantity is only undertaken when at least one further condition for at least one further operating parameter is satisfied. Examples of additional operating parameters are: engine temperature, combustion chamber temperature (each measured or modeled, for example, cumulative injection mass after start), requested desired torque, rpm.

The division according to the invention reduces the wall heat losses, that is, the efficiency can therefore improve during the retarded ignition (which causes deterioration) compared to late ignited homogeneous mixture.

Advantageously, the ignition is further delayed for a division of the injection than without division. Start/run-up are homogeneous with late ignition in order to build up sufficient charge (see below).

Advantageously, the efficiency is so deteriorated already in advance of the switchover via a substantial retard adjustment of the ignition that the charge must be greatly increased for maintaining the requested torque. In this way, the charge threshold, which is required for the division, can be exceeded also for low desired torques.

With an adequately large air charge as a consequence of the retarded ignition, critically small injection times can be avoided also with the conventional design of the injection valves which small injection times can occur for smaller air charges and pregiven maximum lambda (running limit condition).

As a further advantage, further leaning can take place earlier after an engine start during a division. This is so because a division of the fuel quantity into two injections has shown a lean running capability improved in comparison to a purely homogeneous mixture preparation.

The ignition and the precontrol of the air charge must be again adapted for a switchover between operation with and without division. In this respect, reference can be made to the key words "switchover", "torque", "air charge", "ignition time point", "compensation".

An engine control program is known from U.S. Pat. No. 6.394.063 which controls the switchover between stratified operation and homogeneous operation.

In the stratified operation, the engine is operated with a greatly stratified cylinder charge and high air excess in order to obtain the lowest possible fuel consumption. The stratified charge is achieved via a late fuel injection which, in the ideal case, leads to a division of the combustion chamber into two zones. The first zone contains a combustible air/fuel mixture cloud at the spark plug. This cloud is surrounded by a second zone which comprises an insulating layer of air and residual gas. The potential for consumption optimization results from the possibility to operate the engine substantially unthrottled while avoiding charge change losses. The stratified operation is preferred for comparatively low load.

At higher load, when the power optimization is primary, the engine is operated with homogeneous cylinder charge. The homogeneous cylinder charge results from an early fuel injection during the intake operation. As a consequence, a longer time for mixture formation is available up to the combustion. The potential of this operating mode for power optimization results, for example, from the use of the entire combustion chamber volume for filling with a combustible mixture.

In the following, an embodiment of the invention is explained with respect to the figures.

FIG. 2 shows the principal course of rpm, air charge and ignition time point for a switchover between simple and divided injection after a start at constant rpm.

Figure 1:
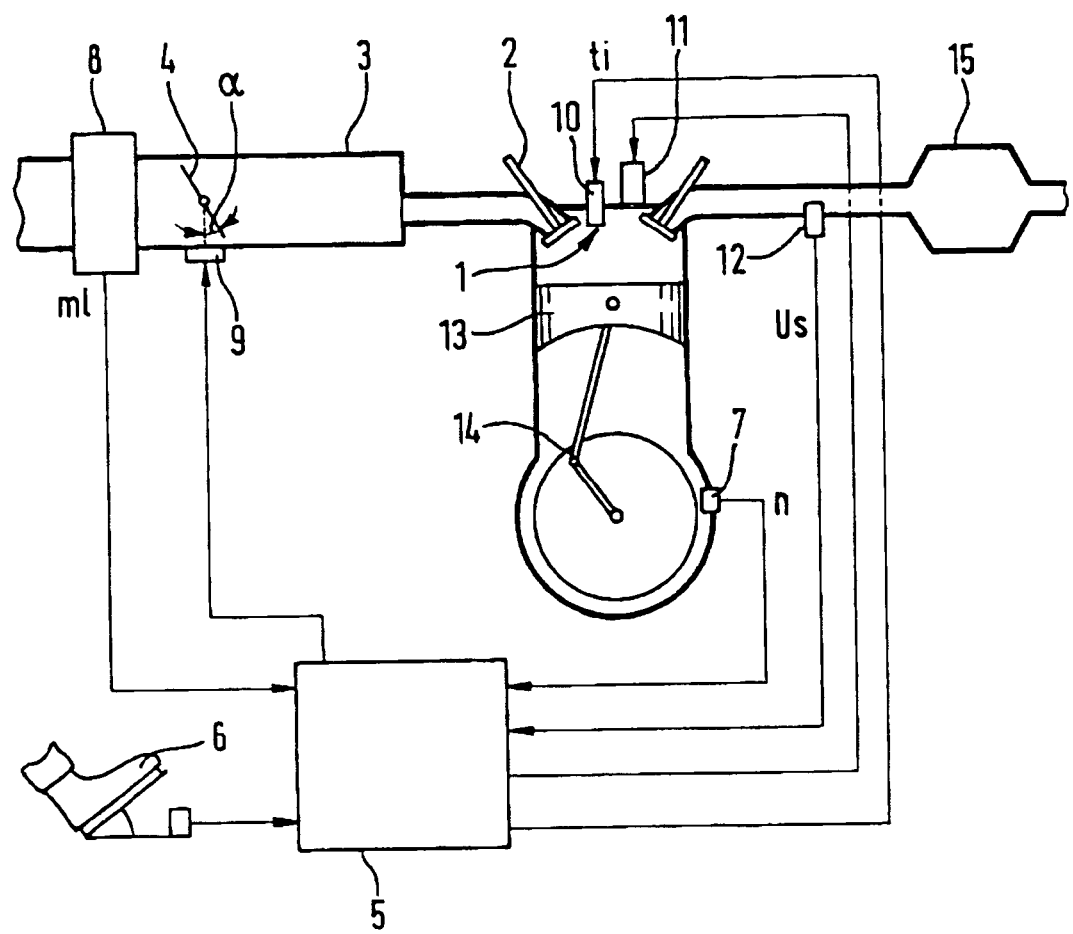
FIG. 1 shows the technical background of the invention.

The 1 in FIG. 1 represents the combustion chamber of a cylinder of an internal combustion engine. The inflow of air to the combustion chamber is controlled via the inlet valve 2. The air is drawn in by suction via an intake manifold 3. The inducted air quantity can be varied via a throttle flap 4 which is driven by a control apparatus 5. Signals are supplied to the control apparatus. These signals are: the torque command of the driver, for example, via the position of an accelerator pedal 6; a signal as to the engine rpm (n) from an rpm transducer 7; a signal as to the quantity ml of the inducted air from an air quantity sensor or intake manifold pressure sensor 8; and, a signal Us as to the exhaust-gas composition and/or the exhaust-gas temperature from an exhaust-gas sensor 12. The exhaust-gas sensor 12 can, for example, be a lambda probe whose Nernst voltage indicates the oxygen content in the exhaust gas and whose internal resistance is applied as an index for the probe temperature, exhaust-gas temperature and/or catalytic converter temperature. The exhaust gas is conducted through at least one catalytic converter 15 wherein the toxic substances from the exhaust gas are converted and/or are temporarily stored.

The control apparatus 5 forms output signals from these input signals and, if required, additional input signals as to additional parameters of the internal combustion engine such as intake air temperature and coolant temperature, et cetera. These output signals are for adjusting the throttle flap angle alpha via an actuating member 9 and for driving a fuel injection valve 10 through which the fuel is metered into the combustion chamber of the engine. Furthermore, the control apparatus controls the triggering of the ignition via an ignition device 11.

The throttle flap angle alpha and the injection pulse width ti are essential actuating quantities, which are to be matched to each other, for realizing the desired torque, the exhaust-gas composition and the exhaust-gas temperature. A further essential actuating quantity for influencing these quantities is the angular position of the ignition relative to the piston movement.

The method suggested here defines, to a certain extent, an air-guided operating mode in contrast to a fuel-guided operating mode. A determination of actuating quantities for adjusting the torque for a fuel-guided operating mode is the subject matter of U.S. Pat. No. 6,522,983. In a fuel-guided operating mode, the air charge (operating point dependent) for a generally lean lambda is precontrolled. Rapid torque interventions take place directly via the fuel quantity, that is, via lambda fluctuations. In an air-guided operating mode, the air charge is precontrolled, in contrast, for a fixed lambda (normally 1 or close to 1). The fuel quantity is directly coupled to the instantaneous air charge because the lambda is a rigid peripheral condition. Rapid torque interventions take place via the ignition time point. In the here preferred air-guided operating mode, the engine torque is therefore primarily adjusted via the ignition time point and the precontrolled air charge; whereas, the injected fuel quantity is directly dependent upon the detected air charge and a preprogrammed air/fuel ratio. The method presented here is characterized in that the poor engine efficiency results primarily from the retarded ignition. The divided injection is used in order to make at all possible so late an injection and to achieve higher CO raw emissions. That is, after the switchover, the ignition angle is further retarded and still more air charge is built up. According to the invention, the efficiency is deteriorated already in advance of the switchover to divided injections in order to increase the air charge. The switchover takes place only when sufficient air charge was detected. Operation is air guided. That is, the lambda is held to an optimal value close to 1.0. Torque interventions take place via the ignition angle. In fuel-guided methods, a minimum distance must be maintained to lambda=1.0 in order to allow for a lambda controller stroke. In this way, for a fuel guided method, a leaner operation has to take place than would be optimal for the emissions.

Furthermore, the control apparatus controls additional functions for achieving an efficient combustion of the air/fuel mixture in the combustion chamber, for example, an exhaust-gas recirculation (not shown) and/or tank venting. The gas force, which results from the combustion, is converted by a piston 13 and a crank drive 14 into a torque.

In this technical field, the catalytic converter temperature can be measured or can be modeled from operating variables of the engine. The modeling of temperatures in the exhaust-gas system of internal combustion engines is known, for example, from U.S. Pat. No. 5,590,521.

In this technical background, the control apparatus 5 controls the above-given method and, if required, its indicated embodiments.

FIG. 2 shows in FIG. 2a the run-up of the rpm to a constant value. In the illustrated example, the value is constant in order to permit the invention to be more clearly shown in FIGS. 2b and 2c.

In FIG. 2b, the air charge of the combustion chambers first decreases with the run-up of the rpm. In parallel, the ignition time point is shifted from advanced ignition (high torque) to a more retarded ignition (low torque). After the run-up of the rpm, the ignition time point runs in the direction of retard. In this way, for example, a torque reserve is made available within which torque losses can be rapidly compensated by advance shifting the ignition. This is utilized in the transition from undivided injection to divided injection. A torque loss because of the division of the injection is compensated by an abrupt advance shift of the ignition. Thereafter, the air charge is further increased and the additional torque resulting therefrom is compensated to a certain extent by a parallel continuous retard shift of the ignition.

The invention claimed is:

1. A method for heating a catalytic converter in an internal combustion engine having gasoline direct injection, the method comprising the steps of:
   increasing the air charge while simultaneously shifting the ignition to retard;
   checking whether the air charge of the cylinders exceeds a pregiven threshold; and,
   dividing the fuel injection into two component quantities which are injected in advance of the ignition as soon as the air charge exceeds the threshold.

2. The method of claim 1, wherein the ignition time point is also adapted when the fuel injection is divided.

3. The method of claim 1, wherein the air charge is further increased and the ignition is further retarded after completed switchover to divided fuel injection.

4. The method of claim 1, wherein the exhaust-gas lambda is adjusted rich or lean in dependence upon the operating state.

5. The method of claim 1, wherein the engine torque is primarily adjusted via the ignition time point and the precontrolled air charge; whereas, the injected fuel mass is directly dependent upon the detected air charge and a preprogrammed air/fuel ratio.

6. The method of claim 1, wherein, with the start of the division of the fuel injection, the summation lambda in the combustion chamber is precontrolled leaner than for a simple injection.

7. The method of claim 6, wherein the lean precontrol is dependent upon the operating state.

8. A method for heating a catalytic converter in an internal combustion engine having gasoline direct injection, the method comprising the steps of:
   increasing the air charge while simultaneously shifting the ignition to retard;
   checking whether the air charge of the cylinders exceeds a pregiven threshold;
   dividing the fuel injection into two component quantities which are injected in advance of the ignition as soon as the air charge exceeds the threshold; and,
   wherein a precontrol of the air charge is again reduced by the switchover before completion of the division of the fuel injection in correspondence to the change of efficiency and combustion limits.

9. A method for heating a catalytic converter in an internal combustion engine having gasoline direct injection, the method comprising the steps of:
   increasing the air charge while simultaneously shifting the ignition to retard;
   checking whether the air charge of the cylinders exceeds a pregiven threshold;
   dividing the fuel injection into two component quantities which are injected in advance of the ignition as soon as the air charge exceeds the threshold; wherein:
   for a switchover of the fuel injection, first a precontrol of the air charge is adapted in each case in correspondence to the expected efficiency change;
   the change of the air charge is corrected by adapting the ignition time point; and,
   the switchover of the fuel injection takes place in dependence upon whether the requested torque can be reached also for the changed fuel injection with the instantaneous air charge and the known combustion limits.

10. A method for heating a catalytic converter in an internal combustion engine having gasoline direct injection, the method comprising the steps of:
    increasing the air charge while simultaneously shifting the ignition to retard;
    checking whether the air charge of the cylinders exceeds a pregiven threshold;
    dividing the fuel injection into two component quantities which are injected in advance of the ignition as soon as the air charge exceeds the threshold;
    wherein, with the start of the division of the fuel injection, the summation lambda in the combustion chamber is precontrolled leaner than for a simple injection; and,
    wherein, before the end of the division of the fuel injection, the summation lambda in the combustion chamber is again precontrolled richer than at the start of the divided injection.

11. A method for heating a catalytic converter in an internal combustion engine having gasoline direct injection, the method comprising the steps of:
    increasing the air charge while simultaneously shifting the ignition to retard;
    checking whether the air charge of the cylinders exceeds a pregiven threshold;
    dividing the fuel injection into two component quantities which are injected in advance of the ignition as soon as the air charge exceeds the threshold; and,
    wherein the correction of the fuel injection for compensating possible wall losses (post-start enrichment) is reduced with the beginning of the division of the fuel injection.

12. A control arrangement for heating a catalytic converter in an internal combustion engine having gasoline direct injection, the method comprising the steps of:
    increasing the air charge while simultaneously shifting the ignition to retard;
    checking whether the air charge of the cylinders exceeds a pregiven threshold; and,
    dividing the fuel injection into two component quantities which are injected in advance of the ignition as soon as the air charge exceeds the threshold.

* * * * *